United States Patent
Nishimura et al.

(10) Patent No.: US 6,939,458 B1
(45) Date of Patent: Sep. 6, 2005

(54) APPARATUS AND METHOD FOR HYDROTHERMAL ELECTROLYSIS

(75) Inventors: Tatsuya Nishimura, Kanagawa (JP); Roberto Masahiro Serikawa, Kanagawa (JP); Qingquan Su, Kanagawa (JP); Masahiro Isaka, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/890,871

(22) PCT Filed: Feb. 10, 2000

(86) PCT No.: PCT/JP00/00744

§ 371 (c)(1), (2), (4) Date: Aug. 7, 2001

(87) PCT Pub. No.: WO00/47520

PCT Pub. Date: Aug. 17, 2000

(30) Foreign Application Priority Data

Feb. 10, 1999  (JP) .................................. 11/033026
Feb. 10, 1999  (JP) .................................. 11/033455

(51) Int. Cl.$^7$ ............................................. C02F 1/461
(52) U.S. Cl. .................................................... 205/742
(58) Field of Search ................................ 204/267, 272, 204/278.5, 671, 672, 673; 205/742

(56) References Cited

U.S. PATENT DOCUMENTS

| | | | |
|---|---|---|---|
| 3,652,405 A | * | 3/1972 | Hess et al. .................... 210/10 |
| 3,798,150 A | | 3/1974 | Gilchrist |
| 3,975,247 A | | 8/1976 | Stralser |
| 4,049,402 A | * | 9/1977 | Fortson ....................... 96/156 |
| 4,389,288 A | | 6/1983 | Vaughan |
| 4,405,420 A | | 9/1983 | Vaughan |
| 4,416,956 A | | 11/1983 | Lawless |
| 4,752,364 A | | 6/1988 | Dhooge |
| 5,439,577 A | | 8/1995 | Weres et al. |
| 5,599,296 A | * | 2/1997 | Spears ......................... 604/26 |
| 6,348,143 B1 | | 2/2002 | Serikawa et al. |
| 6,572,759 B1 | | 6/2003 | Nishimura et al. |
| 6,585,882 B1 | | 7/2003 | Su et al. |

FOREIGN PATENT DOCUMENTS

| | | |
|---|---|---|
| EP | 0 535 320 | 4/1993 |
| FR | 2 780 986 | 1/2000 |

(Continued)

OTHER PUBLICATIONS

Machine Translation of JP 09-117782.*

(Continued)

*Primary Examiner*—Roy King
*Assistant Examiner*—Harry D Wilkins, III
(74) *Attorney, Agent, or Firm*—Wenderoth, Lind & Ponack, L.L.P.

(57) ABSTRACT

A hydrothermal electrolytic apparatus comprises a reaction cell for electrolyzing influent at high temperature and high pressure, wherein an overall surface area of a pair of electrodes located in the reaction cell per 1 m$^3$ of the volume of the influent is 0.05 m$^2$ or more. The hydrothermal electrolytic apparatus has two or more tubular reaction cells each having a metal inner wall serving as a cathode, and an anode is provided in each of the reaction cells. A hydrothermal electrolytic process comprises incorporating conductive particles into an influent to substantially increase a surface area of electrodes during hydrothermal electrolysis.

10 Claims, 11 Drawing Sheets

FOREIGN PATENT DOCUMENTS

| | | | | |
|---|---|---|---|---|
| JP | 50-155347 U | | 12/1975 | |
| JP | 52-114570 A | | 9/1977 | |
| JP | 09-117782 A | | 5/1997 | |
| JP | 9-206796 | | 8/1997 | |
| JP | 09-2159802 A | | 8/1997 | |
| SU | 467038 | * | 9/1975 | ............ C02C 5/12 |
| SU | 962212 | * | 9/1982 | ............ C02F 1/46 |
| WO | 99/07641 | | 8/1998 | |
| WO | WO 00/47308 | | 8/2000 | |
| WO | WO 00/47519 | | 8/2000 | |

OTHER PUBLICATIONS

English translation of Pitora et al (SU 962212).*

Database WPI, Section Ch, Week 198332, Derwent Publications Ltd., London, GB; AN 1983-733133 XP002203345 & SU 962 212 A (Khark Rail Transpt), Sep. 30, 1982.

* cited by examiner

APPARATUS AND METHOD FOR HYDROTHERMAL ELECTROLYSIS

FIELD OF THE INVENTION

The present invention relates to apparatus and processes for performing hydrothermal reaction and electrolysis at the same time. As used herein, hydrothermal electrolysis means that hydrothermal reaction and electrolysis are performed at the same time. According to the present invention, a large amount of influent containing reducible substances such as organics (including synthetic polymers) and ammonia, e.g. organic waste liquors or various industrial waste liquors containing halide ions, can be continuously treated.

PRIOR ART

International Application PCT/JP 98/03544 filed Aug. 10, 1998 (International Publication WO99/07641) discloses hydrothermal electrolytic processes and apparatus previously developed. According to these processes and apparatus, reducing substances such as organics (including synthetic polymers) or ammonia can be effectively oxidatively degraded by performing hydrothermal reaction and electrolysis at the same time. When an oxidizer or strong acid ions such as halide ions are contained in an influent, hydrogen emission can be inhibited during hydrothermal electrolysis. The disclosure of International Application PCT/JP 98/03544 is incorporated herein in its entirety.

During hydrothermal electrolysis, a closed pressure-resistant vessel is typically used as a reaction vessel because a high pressure environment is required. Thus, a batch process or a semi-continuous or continuous process consisting of repeated batch processes is applied when waste liquor is to be clarified by hydrothermal electrolysis.

However, only a small amount of waste liquor could be treated at a time and it was difficult to treat a large amount of waste liquor by a batch process or a semi-continuous process. For example, it is necessary to supply waste liquor and replace treated effluent each time in a case of a batch process. However, operation for bolting a flange or the like requires labor and care in order to perform a reaction at high temperature and high pressure. These processes are inefficient in terms of operating time or running costs.

When waste liquor is to be continuously treated, a large amount of electric power must be supplied in proportion to an amount of waste liquor. Especially when a large amount of high-load influent is to be continuously treated, a quite large amount of electric power must be supplied, which may sometimes correspond to several thousands to several tens of thousands of amperes of direct current. However, it is sometimes difficult to apply several hundreds to several thousands of amperes of direct current, considering that a permissive current density has a limitation depending on an electrode material. As a reaction vessel becomes larger, it also becomes more difficult to homogeneously supply electric power on an electrode surface to homogeneously advance a reaction.

Therefore, an object of the present invention is to provide a hydrothermal electrolytic apparatus capable of efficiently and continuously treating a large amount of waste liquor.

As a result of examinations to solve the above problems, it has been found that a large amount of waste liquor can be efficiently treated by increasing a surface area of electrodes in a high-pressure vessel.

SUMMARY OF THE INVENTION

An aspect of the present invention provides a hydrothermal electrolytic apparatus comprising a reaction cell for electrolyzing an influent containing water and reducing substances at high temperature and high pressure, wherein the reaction cell defines a chamber and has a pair of electrodes and an overall surface area of the pair of electrodes exposed in the chamber per 1 $m^3$ of volume of the chamber in the reaction cell is 0.05 $m^2$ or more.

Preferably, the hydrothermal electrolytic apparatus of the present invention has an inlet at a bottom of the reaction cell for introducing an influent and an outlet at a top of the reaction cell for discharging an effluent. This facilitates continuous treatment of influents.

Preferably, the reaction cell comprises two or more tubular reaction cells each having a metal inner wall serving as a cathode, and an anode is provided in each of the tubular reaction cells. The anode and the cathode can form the pair of electrodes.

Alternatively, the pair of electrodes preferably has a first electrode having two or more concentrically arranged cylindrical first side walls and a first connecting member for connecting the first side walls together, and a second electrode having two or more concentrically arranged cylindrical second side walls and a second connecting member for connecting the second side walls together, wherein the first side walls of the first electrode and the second side walls of the second electrode are alternately arranged to form a channel for influent between the first side walls and the second side walls.

Moreover, the hydrothermal electrolytic apparatus of the present invention preferably further has a high-pressure pump, an influent line for supplying influent to the reaction cell, an oxidizer line for supplying an oxidizer to the reaction cell, and an effluent line for discharging effluent from the reaction cell.

Another aspect of the present invention provides a process for preparing clarified water, comprising the steps of introducing an influent containing water and reducing substances into a reaction cell of a hydrothermal electrolytic apparatus, supplying a direct current into the reaction cell at a temperature of between 100° C. and a critical temperature of the influent and at a pressure that allows water in the influent to be maintained in a liquid phase, and discharging an effluent from the reaction cell. This clarified water may be recycled to another process or discharged to an environment.

Preferred embodiments of the present invention are explained in detail below with reference to the attached drawings.

DESCRIPTION OF THE PREFERRED EMBODIMENTS

Figure 1:
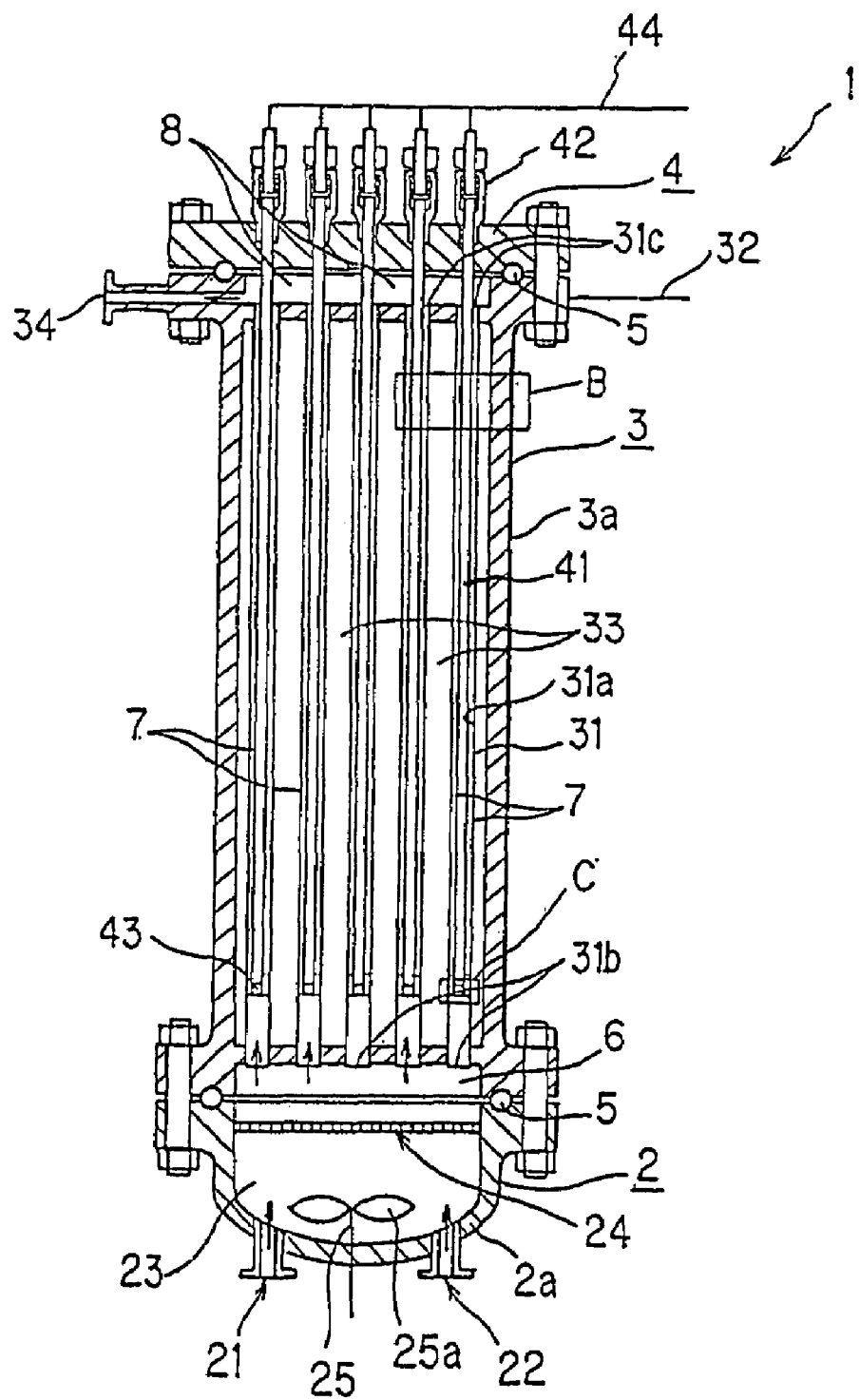
FIG. 1 is a longitudinal sectional view showing an inner structure of a reaction vessel forming a core of a hydrothermal electrolytic apparatus according to a first embodiment of the present invention.
Figure 2:
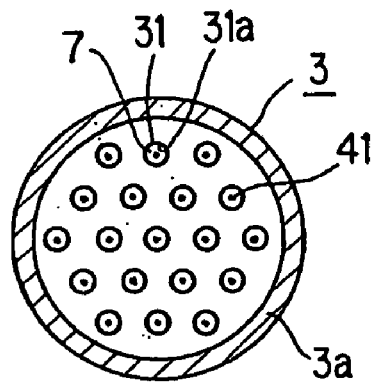
FIG. 2 is a cross-sectional view showing the inner structure of the reaction vessel according to the first embodiment.
Figure 3:
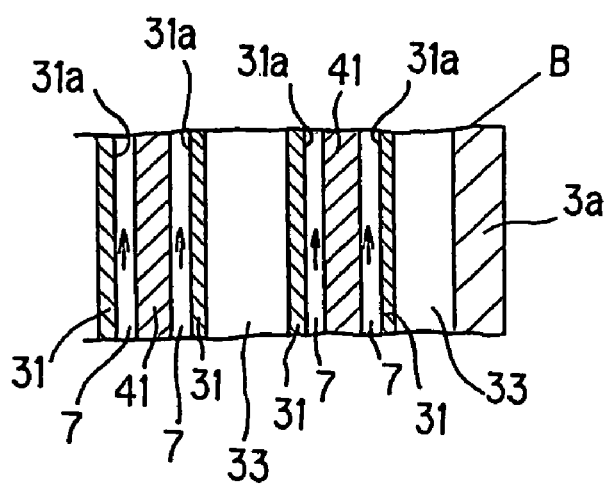
FIG. 3 is an enlarged sectional view of B in FIG. 1.
Figure 4:
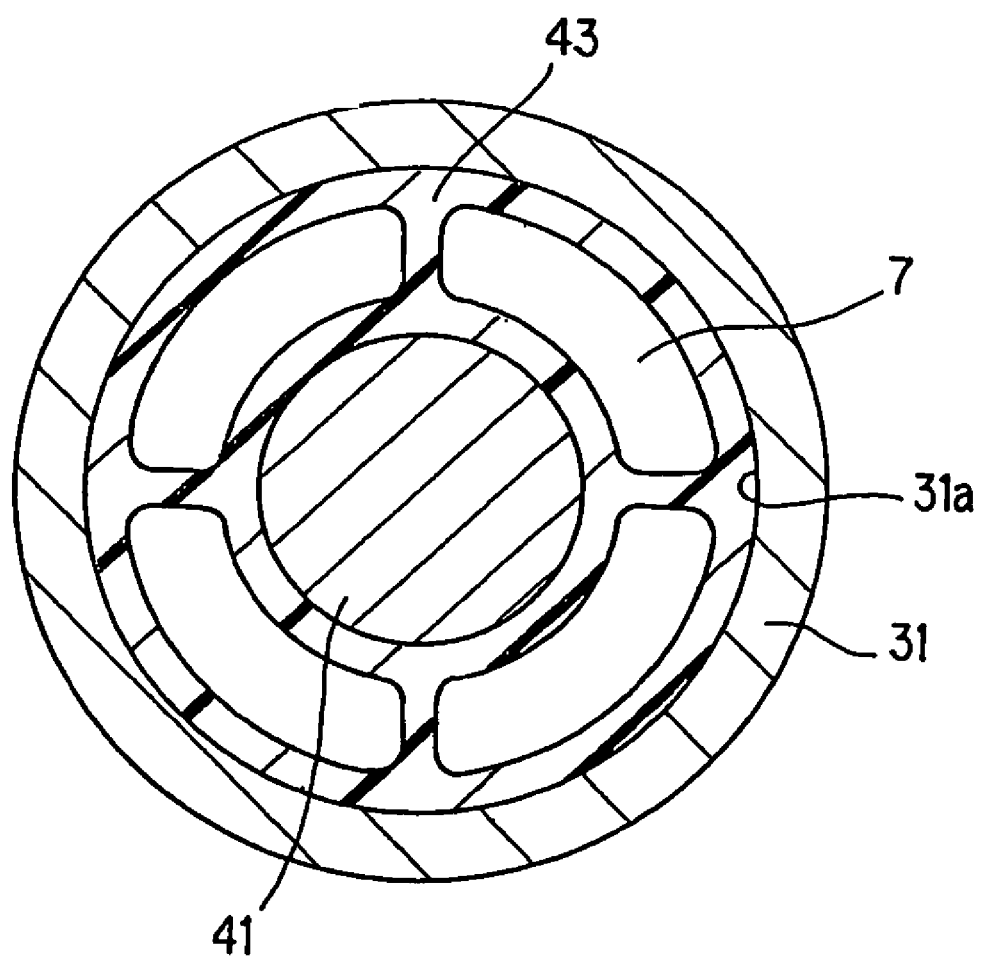
FIG. 4 is an enlarged cross-sectional view showing a partial inner structure of C in FIG. 1.

FIG. 1 is a longitudinal sectional view showing an inner structure of reaction vessel 1 forming a core of a hydrothermal electrolytic apparatus according to a first embodiment of the present invention. FIG. 2 is a widthwise sectional view showing the inner structure of the reaction vessel. FIG. 3 is an enlarged sectional view of B in FIG. 1. FIG. 4 is an enlarged sectional view of C in FIG. 1. FIG. 4 shows a section of the a part at which a spacer 43 is provided.

As shown in FIGS. 1–4, the hydrothermal electrolytic apparatus according to this embodiment comprises a reaction cell for electrolyzing an influent containing water at high temperature and high pressure. The reaction cell defines chambers 7 each of which has a pair of electrodes 31a, 41. An inner face defining chamber 7 can serve as electrode 31a. An overall surface area of the pair of electrodes 31a, 41 exposed in chamber 7 in reaction cell per 1 m$^3$ of a volume of the chamber is 0.05 m$^2$ or more, preferably 0.1 m$^2$ or more, more preferably 0.2 m$^2$ or more. The "overall surface area of electrodes" means an effective surface area of electrodes substantially participating in electrolytic reaction.

If the overall surface area of the pair of electrodes 31a, 41 is less than 0.05 m$^2$, enough electric power cannot be supplied to influent for rapid hydrothermal electrolysis.

In the first embodiment of the present invention shown in FIG. 1, the reaction cell consists of two or more tubular reaction cells 31. Each of reaction cells 31 has provided therein a metal inner wall 31a serving as a cathode, and a discharge electrode 41 serving as an anode.

The first embodiment of the present invention comprises a reaction vessel 1. Reaction vessel 1 comprises a lower vessel part 2, a middle vessel part 3 and an upper vessel part 4. Lower vessel part 2 comprises an inlet 21 for introducing influent, an oxidizer inlet 22 for introducing an oxidizer, and a mixing chamber 23 for mixing the influent introduced from inlet 21 with the oxidizer introduced from oxidizer inlet 22. Middle vessel part 3 comprises tubular reaction cells 31 in which the influent mixed with the oxidizer is electrolyzed under pressure and heat.

Upper vessel part 4 comprises a current feed terminal 42 corresponding to each reaction cell 31. Current feed terminal 42 preferably has an insulating member extending from reaction vessel 1. Each current feed terminal 42 has a discharge electrode 41 extending to an interior of reaction cell 31.

Lower vessel part 2, middle vessel part 3 and upper vessel part 4 are connected together via gaskets 5, which tightly seal interiors of these vessel parts. Thus, reaction vessel 1 as a whole forms a pressure-resistant vessel.

Each of inlet 21 and oxidizer inlet 22 is singly provided in a wall portion 2a on a bottom of lower vessel part 2. Inlet 21 is connected to an influent line and oxidizer inlet 22 is connected to an oxidizer line.

Mixing chamber 23 is partitioned by a dispersion plate 24 and contains a stirrer 25 therein. Dispersion plate 24 may be of any known type for mixing influent by disturbing a flow thereof. Stirrer 25 is a common type having stirring blades 25a and is used to help in mixing influent, and is connected to a motor (not shown).

At a connection between lower vessel part 2 and middle vessel part 3 is provided an introducing chamber 6 for smoothly introducing influent, mixed with an oxidizer in mixing chamber 23, into the reaction cell. Wall 3a of middle vessel part 3 is connected to a negative line 32, which is in turn connected to a negative terminal (not shown) of a direct current source at constant current and voltage.

Tubular bodies forming the tubular reaction cells 31 are electrically connected with wall 3a of middle vessel part 3. For example, a stainless steel tubes may be welded to a stainless steel middle vessel part 3. Thus, inner face 31a of reaction cell 31 in its entirety serves as a cathode. Each reaction cell 31 may be integrally formed with middle vessel part 3, or separately formed and fitted or otherwise incorporated into the middle vessel part. Thus, inner face 31a of reaction cell 31 serves as a negative electrode to prevent corrosion by electrolysis.

Discharge electrode 41 is in the form of a rod having a diameter smaller than an inner diameter of reaction cell 31 and is arranged at a predetermined position in such a manner that each one is inserted into each reaction cell 31. Each discharge electrode 41 may be a cylindrically shaped mesh or net, or a cylinder having an axial hollow.

In the present invention, a distance between the anode and the cathode is preferably equal. If this distance varies, an excessive current flows locally at narrow regions to accelerate deterioration of the anode at these regions. In this embodiment, inner wall 31a of reaction cell 31 preferably has a cylindrical shape. Preferably, an outer peripheral face of discharge electrode 41 also has a cylindrical shape so that a central axis of discharge electrode 41 substantially coincides with a central axis of inner wall 31a of reaction cell 31.

At an end of discharge electrode 41 is provided an insulating spacer 43 to prevent any contact of the discharge electrode with an inner face of reaction cell 31. Insulating spacer 43 is preferably formed to suit a shape of an outer surface of discharge electrode 41 and a shape of an inner face of reaction cell 31. Insulating spacer 43 preferably has a through hole that allows influent to pass therethrough.

Current feed terminal 42 is connected to a positive line 44, which is in turn connected to a positive terminal (not shown) of a constant direct current source separately provided. Thus, discharge electrode 41 serves as an anode.

A chamber 7 is formed between the inner face of each reaction cell 31 and its corresponding discharge electrode 41, and is connected to a discharge channel 8 formed at a connection between middle vessel part 3 and upper vessel part 4. Discharge channel 8 is connected to an outlet 34 at the an upper end of middle vessel part 3 for discharging effluent from reaction vessel 1.

Thus, the reaction vessel in the hydrothermal electrolytic apparatus according to this embodiment has an inlet at the bottom for introducing an influent and an outlet at the top for discharging an effluent. This makes it easier to continuously hydrothermally electrolyze an influent. The reaction vessel has a plurality of rod-like discharge electrodes and the same number of tubular reaction cells.

As used herein, the "volume of the chamber in the reaction cell" does not include a volume of discharge electrode 41 in reaction cell 31, but means a volume of a part where an influent is electrolyzed at high temperature and high pressure. In this embodiment, it specifically means a volume of chamber 7 located between electrodes 31a, 41 in reaction cell 31.

In this embodiment, the "overall surface area of a pair of electrodes exposed in the chamber" means the total of a surface area of electrode 31a and a surface area of discharge electrode 41 exposed in chamber 7. This excludes an area of discharge electrode 41 not exposed in chamber 7, e.g., a surface area of a part of the discharge electrode located within upper vessel part 4, or a surface area of a part of the discharge electrode exposed in discharge channel 8, because these parts do not participate in electrolysis of an influent.

Each member can be formed from any material so long as middle vessel part 3 and each reaction cell 31 are formed from an electrically conductive material, and the reaction vessel as a whole is formed from a heat-resistant and pressure-resistant material. For example, middle vessel part 3 and each reaction cell 31 can be formed from stainless steel. Each reaction cell 31 may have a multilayer structure comprising the innermost layer of an electrically conductive material such as stainless steel and other layers of ceramics.

The hydrothermal electrolytic apparatus according to this embodiment can be used as follows.

An influent is heated up to a sub-critical temperature and then introduced via inlet 21. At the same time, an oxidizer such as oxygen-dissolved water is introduced via oxidizer inlet 22 and mixed with the influent in mixing chamber 23. The influent mixed with the oxidizer is forced upwardly under pressure of successively introduced influent and oxidizer and inserted into reaction cells 31 via lower openings 31b of the reaction cells. The influent introduced into reaction cells 31 is subjected to hydrothermal reaction and electrolytic oxidation reaction as it moves through chambers 7 so that reducing substances in the influent are degraded. Treated influent is introduced into discharge channel 8 via upper openings 31c and discharged from outlet 34. Effluent, after treatment, is introduced into various tanks as in known processes. In the apparatus according to this embodiment, a series of these reaction processes can be continuously performed.

The hydrothermal electrolytic apparatus according to this embodiment has an advantage in that a large amount of influent can be treated because the reaction vessel has electrodes of a specific area as described above, which increases throughput and advances a homogeneous reaction. Moreover, this embodiment allows a large amount of influent to be continuously treated even while using a reaction vessel having an inlet at a bottom and an outlet at a top because these electrodes have a specific area. This embodiment also has an advantage in that current feed terminals are easily mounted to improve workability.

Therefore, the apparatus of the present invention improves efficiency of hydrothermal electrolytic reaction to effectively use input energy and also reduces a size of the apparatus by increasing surface area of electrodes per volume of chambers.

Figure 5:
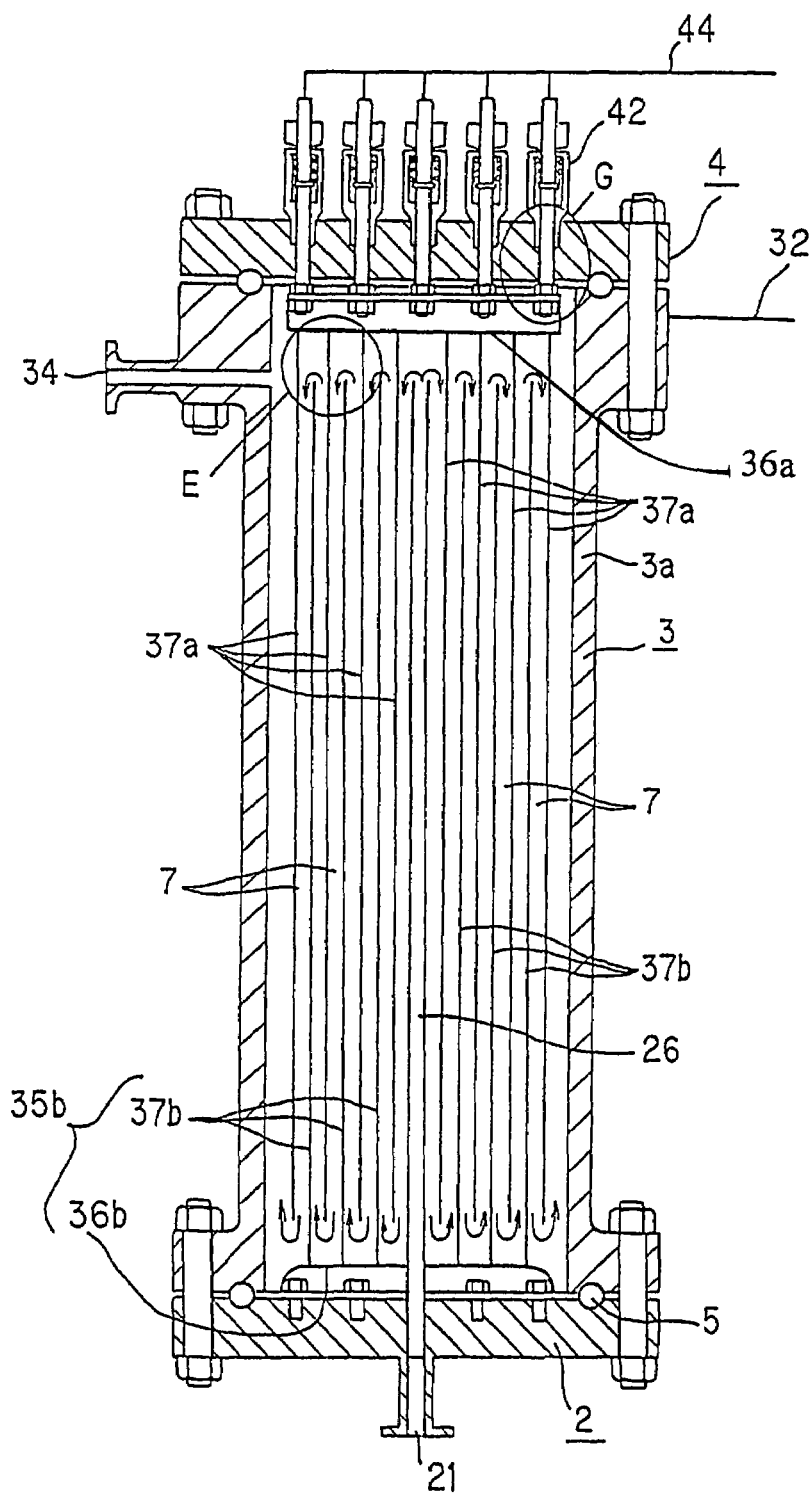
FIG. 5 is a longitudinal sectional view showing the inner structure of a reaction vessel forming a core of a hydrothermal electrolytic apparatus according to a second embodiment of the present invention.
Figure 6:
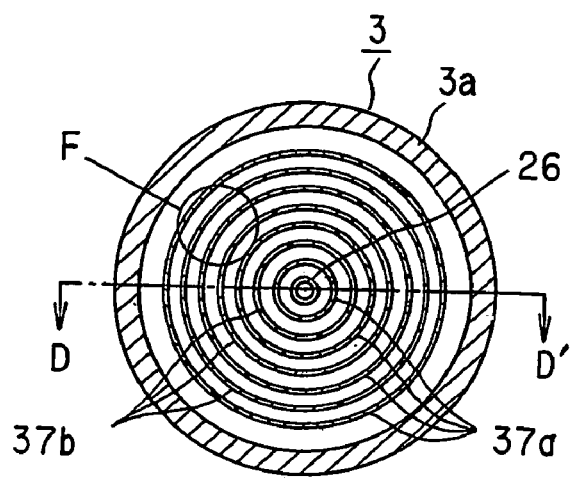
FIG. 6 is a cross-sectional view showing the inner structure of the reaction vessel according to the second embodiment.
Figure 7:
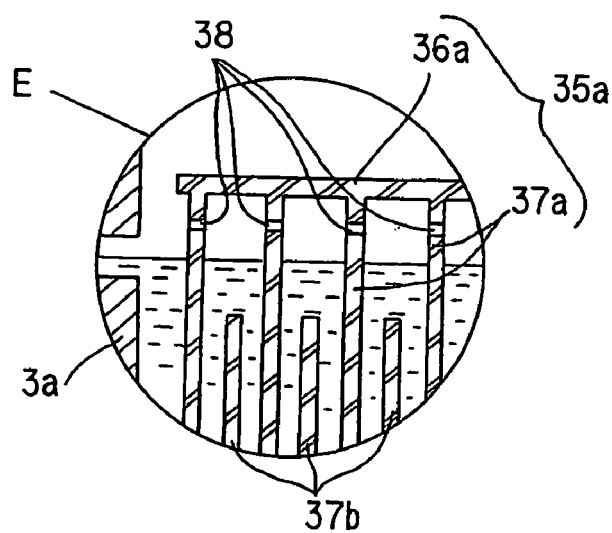
FIG. 7 is an enlarged sectional view of E in FIG. 5.
Figure 8:
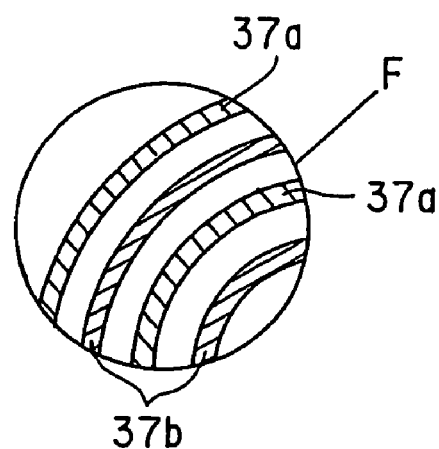
FIG. 8 is an enlarged sectional view of F in FIG. 6.
Figure 9:
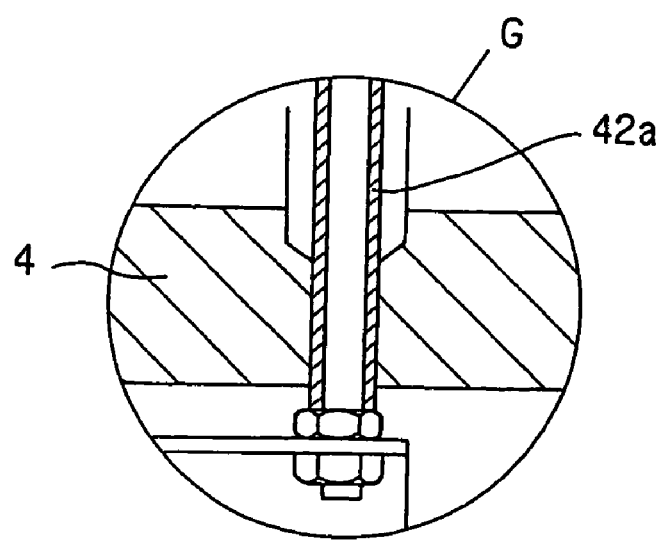
FIG. 9 is an enlarged sectional view of G in FIG. 5.

Next, a second embodiment of the present invention is explained with reference to FIGS. 5–9, in which FIG. 5 is a longitudinal sectional view showing an inner structure of a reaction vessel forming a core of a hydrothermal electrolytic apparatus according to the second embodiment of the present invention, FIG. 6 is a widthwise sectional view showing the inner structure of the reaction vessel, FIG. 7 is an enlarged sectional view of E in FIG. 5, FIG. 8 is an enlarged sectional view of F in FIG. 6, and FIG. 9 is an enlarged sectional view of G in FIG. 5. In the following description, differences from the first embodiment are described especially in detail. The foregoing explanation about the first embodiment is appropriately applied when no special reference is made.

In the second embodiment shown in FIGS. 5–9, lower vessel part 2 has an influent inlet 21 at a central bottom portion, and a pipe 26 is connected to inlet 21 to extend upwardly from lower vessel part 2 to middle vessel part 3. Influent has been preliminarily mixed with an oxidizer in a mixer (not shown), if desired. Preferably, influent has been preliminarily heated up to a temperature of at least 100° C. but below a critical temperature of the influent.

Middle vessel part 3 includes an anode 35a and a cathode 35b. Anode 35a (first electrode) has two or more concentrically arranged cylindrical side walls 37a (first side walls) and a connecting member 36a (first connecting member) for connecting side walls 37a together. In the same manner, cathode 35b (second electrode) has two or more concentrically arranged cylindrical side walls 37b (second side walls) and a connecting member 36b (second connecting member) for connecting side walls 37b together. Side walls 37a of anode 35a and side walls 37b of cathode 35b are alternately arranged to form a channel for influent between side walls 37a and 37b.

Preferably, pipe 26 is electrically connected to connecting member 36b to serve as cathode 35b. Thus, pipe 26 and a reaction vessel body can be protected against corrosion by cathodic protection.

Both connecting members 36a, 36b are in a form of a disk and are electrically conductive. Connecting member 36a fixes anode 35a to current feed terminals 42. Connecting member 36b fixes cathode 35b to lower vessel part 2.

Thus, the hydrothermal electrolytic reactor according to this embodiment has a concentrically arranged cylindrical continuous reaction channel. The reaction channel is continuously provided from a center to an outer periphery of the reaction vessel so that influent flows from the center to the outer periphery of the reaction vessel. Upper vessel part 4 includes a plurality of current feed terminals 42. Upper vessel part 4 and current feed terminals 42 are electrically insulated from each other via an insulator 42a, as shown in FIG. 9.

In this embodiment, the "volume of chambers in the reaction cell" means a volume of a part where influent is hydrothermally electrolyzed in middle vessel part 3. The "volume of chambers in the reaction cell" excludes a volume of anode 35a, a volume of cathode 35b and a volume defined by pipe 26.

When pipe 26 serves as a cathode, radially outer channels of pipe 26 are included in the chamber. When pipe 26 is not electrically conductive and does not serve as a cathode, however, radially outer channels of pipe 26 are not included in the chamber.

In the apparatus according to this embodiment, influent is introduced from inlet 21 and transferred to a top of the reaction vessel through pipe 26, then transferred from the top to a bottom of the reaction vessel through an outer channel, then transferred from the bottom to the top in a subsequent outer channel, and so on. Thus, influent is transferred successively from the center to the periphery of the reaction vessel. During this transfer, reducing substances in the influent are oxidatively degraded by hydrothermal electrolysis. Treated influent is discharged from outlet 34 to an exterior of the reaction vessel.

In addition to advantages as obtained in the first embodiment, the apparatus according to this embodiment also has an advantage in that a reaction channel can be longer so as to improve efficiency of electrolysis. Thus, even low-concentration influents can be effectively treated.

Hydrothermal electrolytic apparatus according to the first and second embodiments are not limited to the foregoing embodiments, and can be modified in various respects without departing from the spirit of the present invention.

For example, a mixing chamber having a stirrer was illustrated in the first embodiment, but the mixing chamber may not be necessary as shown in the second embodiment. The mixing chamber may not necessarily have a stirrer or a dispersion plate so long as influent and oxidizer, or the like, are mixed with one another.

Figure 10:
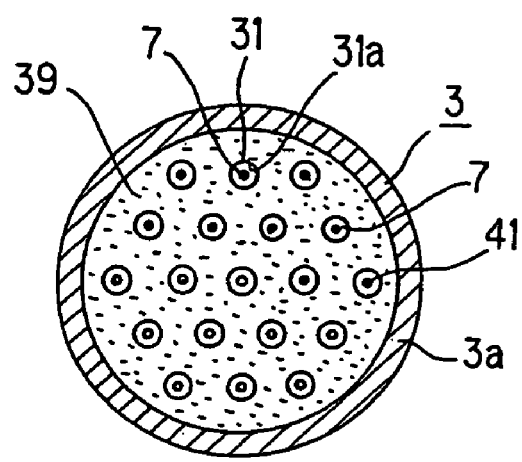
FIG. 10 shows a variant of the first embodiment of the present invention.
Figure 11:
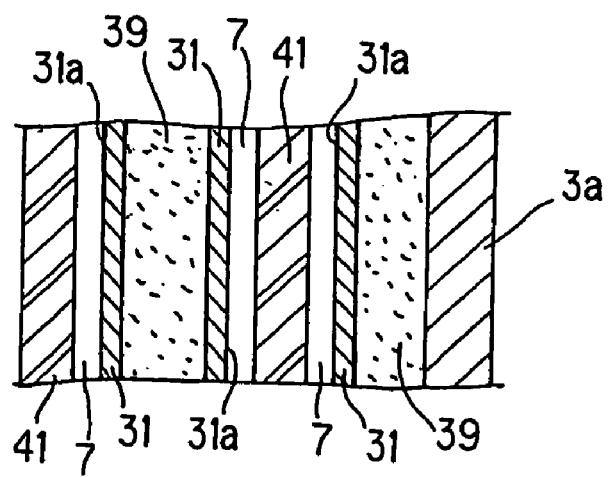
FIG. 11 is a cross-sectional view showing an inner structure of the reaction vessel of the variant of the first embodiment of the present invention shown in FIG. 10.

The embodiment shown in FIGS. 2 and 3 may be replaced by the embodiment shown in FIGS. 10 and 11. That is, a heat-insulating material 39 may be filled outside of reaction cells 31 in middle vessel part 3.

Alternatively, the reaction vessel may be thermally insulated by evacuation from a vacuum pump via a port formed in middle vessel part 3 instead of using an insulating material.

Figure 12:
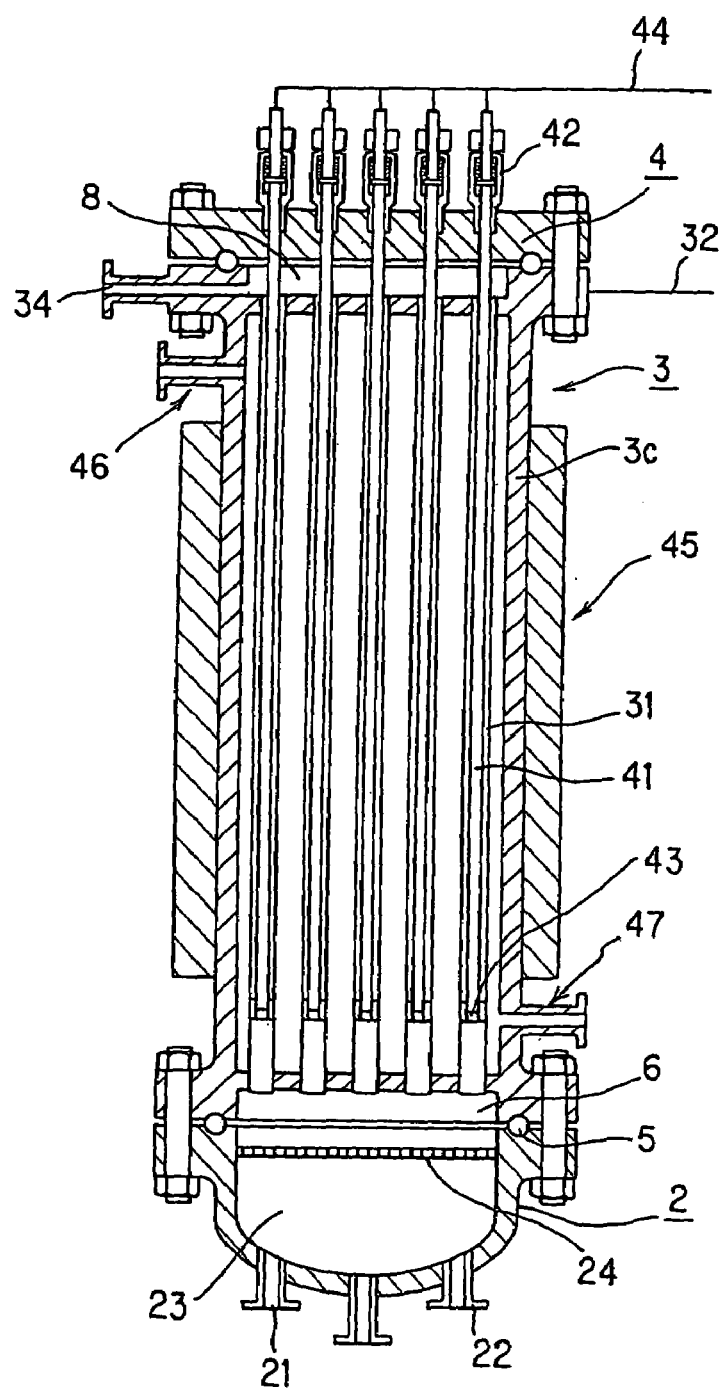
FIG. 12 shows another variant of the first embodiment of the present invention.

Alternatively, a temperature may be maintained by providing a heater 45 on an outer peripheral face of middle vessel part 3 as shown in FIG. 12. Ports 46 and 47 may be further provided in middle vessel part 3 as shown in FIG. 12. Thus, the temperature can be maintained to be constant by directly heating an interior of middle vessel part 3 with a thermal fluid flown from port 46 into middle vessel part 3. The thermal fluid is discharged from port 47. The thermal fluid may be used not only for heating but also cooling.

It is useful to provide a heater on the outer peripheral face of middle vessel part 3 as shown in FIG. 12 especially in the second embodiment in which temperature of an influent may be lowered as the influent approaches a peripheral face of the vessel.

Next, materials of members, reaction conditions or the like that can be used in the present invention are described. In hydrothermal electrolytic apparatus of the present invention, the discharge electrode or anode preferably has a surface having ruthenium, iridium, platinum, palladium, rhodium, tin or an oxide thereof or a ferrite. For example, the discharge electrode itself may be made from any of these materials. Alternatively, a base material of the discharge electrode may be coated with any of these materials.

Ruthenium, iridium, platinum, palladium, rhodium and tin may be elemental metals or oxides. Alloys of these metals are also preferably used. Such alloys include, for example, platinum-iridium, ruthenium-tin and ruthenium-titanium. These metals show high corrosion resistance, and excellent insolubility for use as an anode. In some preferred embodiments, electrodes are based on palladium, ruthenium or an alloy of platinum and iridium.

During hydrothermal electrolytic reaction of the present invention, current density at a surface of an anode is preferably 0.1 mA/dm$^2$–500 A/dm$^2$. If the current density is higher than 500 A/dm$^2$, a surface of the anode is liable to be exfoliated or dissolved. If the current density is lower than 0.1 mA/dm$^2$, however, an area of the anode must be increased and thus the system becomes bulky. The current density is more preferably 10 mA/dm$^2$–100 A/dm$^2$, most preferably 100 mA/dm$^2$–50 A/dm$^2$. If a new material for the anode is developed, the current density at the anode can be further increased.

In hydrothermal electrolytic apparatus and processes of the present invention, an influent containing water and reducing substances can be treated to oxidatively degrade the reducing substances. Influents that can be treated by the present invention include various waste liquors. Reducing substances that can be degraded by the present invention include organics and ammonia. Examples of organics include aliphatic and aromatic hydrocarbons such as alkanes, alkenes, alkynes; alcohols; aldehydes; ketones; amines; carboxylic acids such as acetic acid; carboxylic acid derivatives such as esters, amides, anhydrides; halogenated hydrocarbons; phenols; sulfur-containing organic compounds such as sulfoxides, mercaptans, thiols, polysulfones; and the like. Organics also include synthetic polymers such as polyolefins, polyesters or various engineering plastics.

Influents preferably have fluidity, and may be any of suspension, emulsion, aqueous solution or slurry, but preferably suspension or slurry. Influents may contain liquid or solid reducing substances. Influents include suspensions of unprecipitable solid particles dispersed in water, emulsions of liquid particles dispersed in water, aqueous solutions of liquid organics or inorganic dissolved in water and mixtures thereof. For example, influents contain a continuous phase containing water, liquid organics and dissolved salts and a discontinuous phase containing solid organics such as particles, and optionally non-combustible solids such as ash.

Preferably, influents contain a strong acid ions. This is because strong acid ions show an electrochemical catalytic effect to advance hydrothermal electrolytic reaction more efficiently. The strong acid ions may be inorganic acid ions or organic acid ions. However, the strong acid ions are preferably inorganic acid ions because organic acid ions may be degraded as hydrothermal electrolysis proceeds.

Suitable inorganic strong acid ions include, for example, halide ions, sulfate ions ($SO_4^{2-}$), nitrate ions ($NO_3^-$), phosphate ions ($PO_4^{3-}$), among which halide ions are especially preferred. Suitable organic strong acid ions include, for example, trifluoroacetate ions ($CF_3COO^-$).

Suitable halide ions include chloride ions ($Cl^-$), bromide ions ($Br^-$), iodide ions ($I^-$) or any combination thereof, among which chloride ions or bromide ions are especially preferred. A halide ion-producing salt may be dissolved in the an influent. A hydrohalic acid such as hydrogen chloride (HCl), hydrogen bromide (HBr) or hydrogen iodide (HI) may be contained in an influent. When an influent contains polyvinyl chloride, chloride ions move to an aqueous phase to incorporate chloride ions as hydrothermal reaction proceeds.

For hydrothermal electrolysis according to the present invention, an oxidizer is preferably added to an influent to more efficiently advance hydrothermal electrolytic oxidation. Oxidizers that can be used in the present invention are oxygen gas, ozone gas, hydrogen peroxide and hypohalous acids, more preferably oxygen gas. Oxygen gas may be a gas containing oxygen gas, e.g. air is preferably used. Thus, air can be bubbled into water or the like to dissolve oxygen, and a resulting oxygen-dissolved water can be introduced as an oxidizer via oxidizer inlet 22. Alternatively, compressed air can be introduced into reaction cell 23 to serve as an oxidizer.

During hydrothermal electrolysis according to the present invention, hydrothermal reaction takes place at a temperature of between 100° C. and a critical temperature of an influent, and at a pressure that allows the influent to be in a liquid phase. Temperatures lower than 100° C. are not preferred because a rate of hydrothermal reaction is lowered to extend a reaction time. However, a finding of the present invention cannot be directly applied for temperatures higher than the critical temperature because physical properties of aqueous medium significantly change at this temperature. At a super-critical stage, for example, solubility of electrolytes greatly decreases and electric conductivity is decreased.

Figure 13:
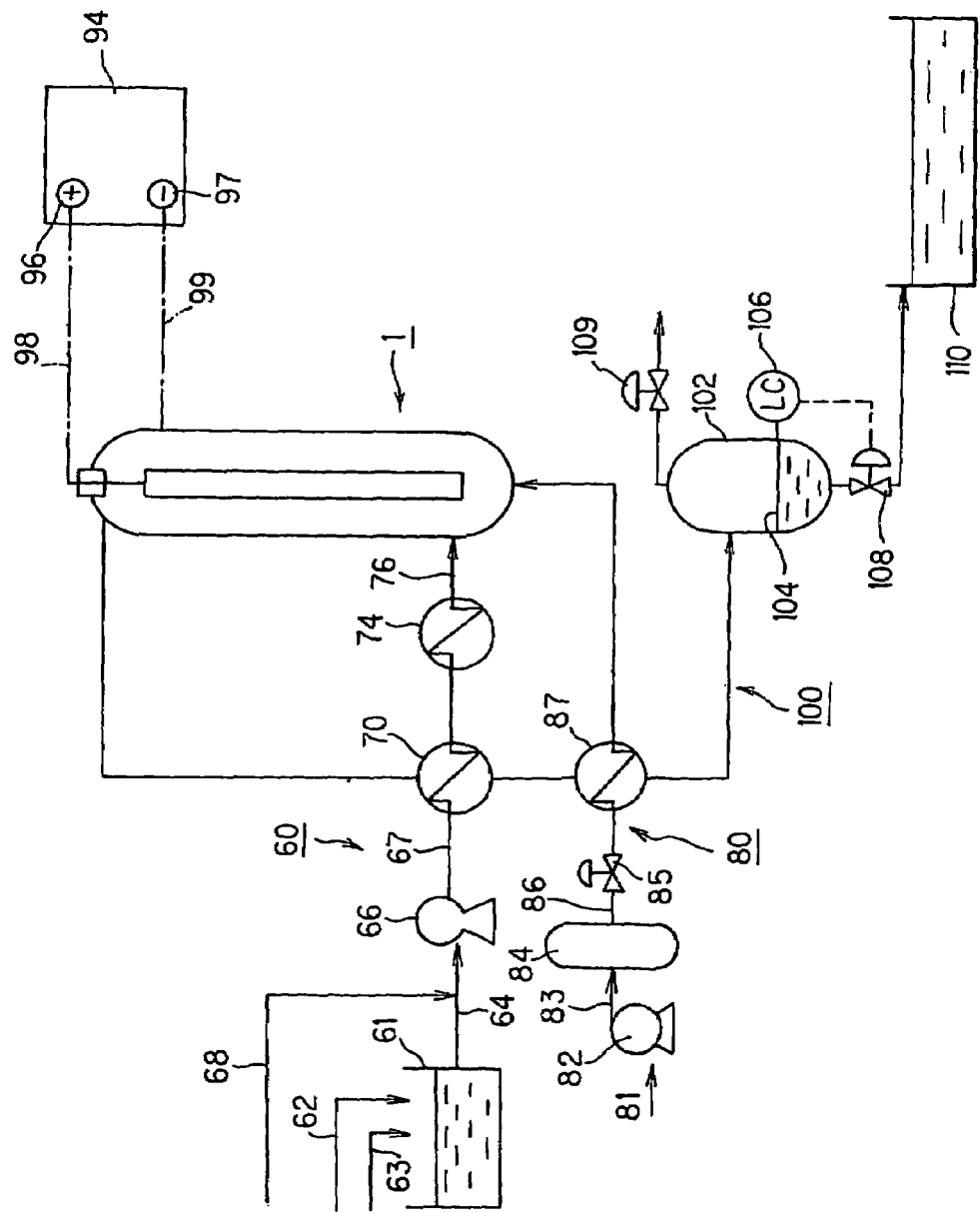
FIG. 13 is a schematic view of a hydrothermal electrolytic treatment system of the present invention.

Next, a specific arrangement of an influent treatment system using a hydrothermal electrolytic reactor according to the present invention is explained with reference to FIG. 13. FIG. 13 shows such an influent treatment system. In the treatment system shown in FIG. 13, an influent line 60 for supplying an influent is connected to a hydrothermal electrolytic reaction vessel 1 of the present invention. Influent line 60 preferably has a feed tank 61, a high-pressure pump 66, a heat exchanger 70 and a heater 74, and an influent can be transferred through these components in this order. Hydrothermal electrolytic reaction vessel 1 may consist of a hydrothermal electrolytic reaction vessel according to the first embodiment, a hydrothermal electrolytic reaction vessel according to the second embodiment, or the like.

Feed tank 61 can hold an influent. To feed tank 61 are connected a wastewater line 62 for introducing wastewater into feed tank 61 and a halide line 63 for supplying a halide ion source, such as chloride ions (Cl⁻), into feed tank 61. This halide ion source may be sea water. Halide line 63 can supply a halide ions such as chloride ions to feed tank 61 so as to control a halide ion level in the influent held in feed tank 61.

Feed tank 61 can be connected to high-pressure pump 66 via line 64 to transfer an influent. A tap water line 68 for supplying tap water is preferably connected to line 64 so that tap water, substantially free from reducing substances, can be transiently flowed when the hydrothermal electrolytic apparatus shown in FIG. 13 is started up or stopped.

High-pressure pump 66 pressurizes the influent to a pressure required for hydrothermal reaction so as to force the influent into reaction vessel 1 under this pressure via heat exchanger 70 and heater 74.

Influent line 60 preferably has heat exchanger 70. Heat exchanger 70 is connected to influent line 60 and effluent line 100 so that heat exchanger 70 exchanges heat between influent flowing in influent line 60 and effluent flowing in effluent line 100. Influent pressurized in high-pressure pump 66 is often at room temperature. However, effluent discharged from reaction vessel 1 is maintained at high temperature via hydrothermal reaction. Therefore, heat exchanger 70 heats influent flowing in influent line 60 and cools effluent flowing in effluent line 100. Even if the heat exchanger is not provided, only heat efficiency decreases.

Preferably, influent line 60 has heater 74 for further heating influent heated by heat exchanger 70. Especially when reaction vessel 1 has a large diameter, it is inefficient to heat influent in reaction vessel 1 from an exterior of reaction vessel 1, and it is thus preferable to provide heater 74 in the influent line. Heater 74 heats the influent to a temperature required for hydrothermal reaction, for example. A temperature to which the influent is heated is determined taking into account exothermic heat from an oxidation reaction, and exothermic heat from electrolysis of reducing substances in reaction vessel 1. Another heater for heating an exterior of reaction vessel 1 may also be provided.

Separately from influent line 60, an oxidizer line 80 is preferably provided. Suitable oxidizers include gases containing oxygen gas such as air. Air is introduced into compressor 82 via line 81 and preferably pressurized from 1 MPa to 25 MPa, for example. This compressed air is introduced into accumulator 84 via line 83. Thus, compressor-induced pulsation of compressed air can be prevented.

A valve 85 for controlling an amount of compressed air, i.e. an amount of oxidizer, is provided downstream of accumulator 84. Compressed air is preheated in heat exchanger 87 and then introduced into reaction vessel 1. Heat exchanger 87 heats compressed air and cools effluent.

Alternatively, a liquid such as water, in which oxygen gas is dissolved, may be introduced into reaction vessel 1. Oxidizers in a form of a gas such as oxygen gas (including air) have higher water-solubility at lower temperature or higher pressure. Therefore, an oxidizer in the form of a gas may be dissolved in water at low or room temperature under high pressure, and then this cold water may be supplied to the reaction vessel. Alternatively, aqueous hydrogen peroxide, a hypochlorous acid or a solid oxidizer may be dissolved in water and supplied to the reaction vessel via a high-pressure pump or the like. When an oxidizer rich in water is added, an additional heater may be provided between high-pressure pump 86 and reaction vessel 1.

Preferably, oxidizer line 80 is directly connected to reaction vessel 1. If oxidizer line 80 is connected to influent line 60, line 76 between heater 74 and reaction vessel 1 will be susceptible to corrosion. On the other hand, when an oxidizer is directly introduced into reaction vessel 1, an inner wall of reaction vessel 1 can be protected from corrosion because the inner wall of reaction vessel 1 serves as a cathode for electrolysis.

Reaction vessel 1 may consist of a reaction vessel according to the first or second embodiment as described above. Preferably, reaction vessel 1 has an axially extending tubular shape, preferably a cylindrical shape. Positive terminal 96 and negative terminal 97 of direct current source 94 are connected to an anode and a cathode of reaction vessel 1 via lines 98, 99, respectively.

In the embodiment shown in FIG. 13, an effluent line 100 for discharging hydrothermally electrolyzed influent is connected to reaction vessel 1. Preferably, effluent line 100 has heat exchangers 70/87, a gas-liquid separator 102, and an effluent tank 110, and effluent hydrothermally electrolyzed in reaction vessel 1 can be transferred through these components in this order. Heat exchangers 70/87 have already been explained.

Preferably, gas-liquid separator 102 is connected to effluent line 100. Gas-liquid separator 102 separates gas and liquid in an effluent. The effluent is held at a predetermined level 104 in gas-liquid separator 102. A pressure transmitter tube may be provided between a space above level 104 and effluent below level 104, and a level, detector for determining a gas-liquid interface or slurry, level may be provided in this pressure transmitter tube. Level-detecting mechanism 106 may be designed to measure level 104 by a pressure difference between gas and liquid to discharge effluent in such a manner that level 104 may be fixed or within a fixed range. Gas-liquid separator 102 may be provided with a piezoelectric element, for converting pressure into an electric signal, both above and below level 104, whereby this electric signal is entered into a level detector to detect the pressure difference.

Preferably, gas-liquid separator 102 has level-controlling mechanism 106 for stabilizing a level of the effluent in gas-liquid separator 102 within a fixed range. This level-controlling mechanism may have a level detector for detecting a pressure difference between gas and the effluent, a valve for discharging the effluent, and a controller for controlling the valve by a signal from the level detector. The level-controlling mechanism may have a pressure transmitter tube or a piezoelectric element.

A valve 108 is connected to gas-liquid separator 102 so that the effluent in gas-liquid separator 102 can be discharged into container 110 when valve 108 is opened. Preferably, switching of valve 108 is controlled by a signal from level-controlling mechanism 106.

Gas-liquid separator 102 may have a pressure controlling mechanism for controlling pressure in the gas-liquid separator within a predetermined range. This pressure controlling mechanism may have, for example, a pressure detector for detecting the pressure of a gas phase, a valve for discharging gas, and a controller for controlling the valve by a signal from the pressure detector. The pressure-controlling mechanism controls the pressure in a range so that influent is maintained in a liquid phase, and reaction vessel 1 and gas-liquid separator 102 are safely operated, for example. The pressure detector may have a piezoelectric element.

A valve 109 is connected to gas-liquid separator 102 so that gas in gas-liquid separator 102 can be discharged to an atmosphere when valve 109 is opened. Preferably, switching of valve 109 is controlled by a signal from a pressure-controlling mechanism (not shown.

Next, a hydrothermal electrolytic process using the hydrothermal electrolytic treatment system shown in FIG. 13 is explained.

Explanation begins with operation at start-up. Suppose that no liquid has been introduced into reaction vessel 1. Tap water is first introduced into influent line 60 from tap water line 68 at room temperature and atmospheric pressure. Tap water is transferred through heat exchanger 70, heater 74 and then reaction vessel 1 by high-pressure pump 66. After tap water is introduced into heater 74, heater 74 is activated to heat the tap water. Thus, heated tap water is discharged from reaction vessel 1 to effluent line 100 and then discharged into container 110 via gas-liquid separator 102.

After the system is stabilized, tap water supply from the tap water line to influent line 60 is stopped and influent supply from feed tank 61 to influent line 60 is started. Halide ion level, or the like, of the influent is preliminarily controlled via halide line 63 or the like. The influent is introduced into reaction vessel 1 while heating of the influent is continued in heater 74. An oxidizer is introduced into reaction vessel 1 via oxidizer line 80.

After the influent and oxidizer are introduced into reaction vessel 1, electrolysis is started. Thus, direct current source 94 is turned on to supply direct current to the anode and cathode of reaction vessel 1. The influent maintained in a liquid phase under high temperature and high pressure moves through reaction vessel 1, during which hydrothermal reaction and electrolysis proceed at the same time. A heating temperature of heater 74 is appropriately lowered because heat is generated with hydrothermal reaction and electrolysis.

A reaction time should be enough long for reducing substances in the influent to be oxidatively degraded, for example 1 second to 48 hours, preferably 1 minute to 24 hours. The reaction time is more preferably 5 hours or less, still more preferably 2 hours or less. The reaction time is adjusted as a function of volume of reaction vessel 1 and feed flow rate of the influent.

When a reaction is to be stopped, inflow from feed tank 61 to influent line 60 is stopped and tap water is introduced from the tap water line to influent line 60. Oxidizer supply from oxidizer line 80 into reaction vessel 1 is also stopped. Then, the direct current source is turned off to stop electrolysis. Then, an output of heater 74 is lowered so that a temperature of the influent flowing into reaction vessel 1 is gradually lowered.

According to the first and second embodiments of the present invention, influent can be efficiently treated by hydrothermal electrolytic reaction by increasing a surface area of electrodes for hydrothermal electrolysis, as has been described above.

However, it is not always easy to increase the surface area of electrodes as desired because the surface area of electrodes cannot be indefinitely increased in a limited space of the reaction vessel even by the above approach.

Thus, also provided is a process and an apparatus for substantially increasing a surface area of electrodes easily and inexpensively as alternatives to the foregoing embodiments.

Namely, it has been found that the surface area of electrodes can be substantially increased by incorporating electrically conductive particles into an influent, preferably suspending electrically conductive particles in the influent so that the conductive particles present in the influent can substantially serve as an electrode during electrolysis of the influent.

Incorporation of electrically conductive particles into the influent means that the influent containing water and electrically conductive particles is located between an original cathode and an original anode in a hydrothermal electrolytic apparatus. When a direct current voltage is applied across the original cathode and the original anode, individual conductive particles serve as an anode at surfaces facing the original cathode, and serve as a cathode at surfaces facing the original anode under an effect of an electric field. Therefore, a current flows locally between the original cathode and surfaces of individual conductive particles serving as an anode, and also a current flows locally between the original anode and surfaces of conductive particles serving as a cathode. When two conductive particles are located in proximity to but not in contact with each other, and a cathodic surface of one conductive particle faces an anodic surface of the other conductive particle, for example, a current flows locally between the cathodic surface and the anodic surface. This also applies to more than two discrete conductive particles, in which case a current seems to flow between a cathodic surface of a conductive particle and an anodic surface of another conductive particle.

Thus, current flowing between the original anode and the original cathode increases and a voltage across the original anode and the original cathode also increases when conductive particles exist in an influent as compared to when no conductive particles exist in the influent. Therefore, a large amount of electric power can be supplied to the influent to greatly improve throughput and process efficiency of the hydrothermal electrolytic apparatus without increasing a surface area of the original anode and the original cathode.

Accordingly, a third aspect of the present invention provides a hydrothermal electrolytic process comprising a step of subjecting an influent containing water, reducible substances and conductive particles to electrolysis at a temperature of between 100° C. and a critical temperature of the influent, and at a pressure that allows water in the influent to be maintained in a liquid phase.

In the third aspect of the present invention, the conductive particles are suspended in the influent, and the influent preferably further contains a strong acid ions. Preferably, electrolysis is followed by a step of separating the conductive particles and a step of adding separated conductive particles to an influent again.

Still another aspect of the present invention provides a hydrothermal electrolytic apparatus comprising a feeder for supplying an influent containing water and reducing substances with conductive particles, and a reaction cell for subjecting the influent supplied with the conductive particles to electrolysis at a temperature of between 100° C. and a critical temperature of the influent and at a pressure that allows water in the influent to be maintained in a liquid phase. In the apparatus, the reaction cell preferably has a pair of electrodes, more preferably one of which serves as an anode and the other of which serves as a cathode.

Still another aspect of the present invention provides a hydrothermal electrolytic apparatus comprising a reaction cell for supplying a direct current to an influent containing water, reducing substances and conductive particles at a temperature of between 1001° C. and a critical temperature of the influent and at a pressure that allows water in the influent to be maintained in a liquid phase, and a separator for separating the conductive particles from an effluent. Preferably, the reaction cell has a pair of electrodes, more preferably one of which serves as an anode and the other of which serves as a cathode.

In the hydrothermal electrolytic apparatus, the separator preferably comprises a liquid cyclone, or the separator preferably comprises a filter device.

In the third aspect of the present invention, the influent contains conductive particles. When a direct current voltage is applied across an original cathode and an original anode in a hydrothermal electrolytic apparatus supplied with an influent containing conductive particles, individual conductive particles serve as an anode at surfaces facing the original cathode and as a cathode at surfaces facing the original anode under an effect of an electric field. Therefore, a current flows locally between the original cathode and surfaces of individual conductive particles serving as an anode, and also a current flows locally between the original anode and surfaces of conductive particles serving as a cathode. When two conductive particles are located in proximity to but not in contact with each other, and a cathodic surface of one conductive particle faces an anodic surface of the other conductive particle, for example, a current flows locally between the cathodic surface and the anodic surface. This also applies to more than two discrete conductive particles, in which case a current seems to flow between a cathodic surface of a conductive particle and an anodic surface of another conductive particle. Therefore, a surface area of electrodes can be substantially increased without increasing a surface area of the original anode and the original cathode.

Preferably, conductive particles are suspended in an influent. As a result, solid conductive particles can flow with the influent. This also prevents conductive particles from adhering to a surface of electrodes.

Conductive particles may be wholly formed of a conductive material. Alternatively, they may be particles of a conductive material coated with another conductive material, or particles of a non-conductive material coated with a conductive material. Even particles having an insulating oxide or the like deposited on their surfaces by corrosion or other reasons are regarded as conductive particles so long as they are generally conductive.

Particles formed of a conductive material include, for example, carbon particles, metal particles and conductive oxide particles. Carbon particles include, for example, particles of graphite. Metal particles include, for example, so-called metal powders such as iron powder, copper powder, silver powder, nickel powder, cobalt powder and aluminum powder. Conductive oxide particles include particles of a ferrite and ruthenium oxide. In terms of costs, iron powder and aluminium powder are preferred. Iron powder includes powdered scrap from machining of steel (including stainless steel), cast iron or the like.

Particles of a conductive material coated with another conductive material include metal particles coated with a thin film of another metal, such as copper particles coated with platinum.

Particles of a non-conductive material coated with a conductive material include particles of an oxide powder coated with a metal thin film, such as aluminum oxide particles coated with copper.

Particles of a conductive or non-conductive oxide powder coated with a conductive oxide are also suitable, such as zirconium oxide particles coated with iridium oxide and silicon dioxide particles coated with ruthenium oxide.

Synthetic polymer particles coated with a metal or a conductive oxide are also suitable, such as polymer particles of polyethylene glycol coated with ruthenium oxide.

Techniques for coating a metal thin film include electroplating, electroless plating, sputtering, physical vapor deposition, chemical vapor deposition, and the like. Techniques for coating a conductive oxide thin film include calcination, sputtering, physical vapor deposition, chemical vapor deposition, and the like.

These conductive particles are subjected to a current in a presence of strong acid ions such as halide ions at high temperature and high pressure. Suitable conductive particles may be irreversible particles liable to be molten or corroded under these conditions, or reusable chemically stable particles. For single use, iron powder, aluminium powder or the like are preferred in terms of costs. Reusable conductive particles preferably have such an excellent corrosion resistance that they remain insoluble even if a current is applied.

Reusable conductive particles are preferably formed of, or coated with, a conductive material having ruthenium, iridium, platinum, palladium, rhodium, copper, nickel, tin or an oxide thereof, or a ferrite.

Ruthenium, iridium, platinum, palladium, rhodium, copper, nickel and tin may be elementary metals or oxides. Alloys of these metals are also preferably used. Such alloys include, for example, platinum-iridium, ruthenium-tin and ruthenium-titanium. In some embodiments, conductive materials based on palladium, ruthenium or an alloy of platinum and iridium are especially preferred.

Conductive particles may be in any form such as, but not limited to, sphere, rod, disk, T-shape, donut, tube, fiber, and the like. Hollow particles are also suitable.

Conductive particles preferably have a size less than a distance between an anode and a cathode. An average size of conductive particles is preferably 1 cm or less, more preferably 5 mm or less, still more preferably 1 mm or less, most preferably 0.5 mm or less. For example, a size of spherical conductive particles means their diameter. A size of rod-like or tubular conductive particles means their length. A size of conductive particles may be homogeneous or may widely vary.

Rod-like or tubular conductive particles preferably have an aspect ratio, i.e. a ratio of length to diameter of the rod or tube, of 0.1–1000, more preferably 0.5–100.

An influent preferably contains at least 0.01% by weight conductive particles, more preferably at least 0.1% by weight conductive particles. Pressure of conductive particles in an amount even as small as 0.01% by weight in the influent increases a current, and therefore, a voltage across original electrodes.

An influent preferably contains at most 30% by weight conductive particles, more preferably at most 10% by weight conductive particles. If more than 30% by weight of conductive particles are contained, fluidity of the influent is affected and a probability of a short circuit between electrodes significantly increases.

A content of conductive particles in an influent means content in a feed line for supplying the influent into a reaction cell. This is because conductive particles are not always uniformly distributed in the reaction cell so that content is difficult to exactly determine. When the reaction cell is tubular and influent is transferred from a bottom of the cell to a top of the cell, for example, concentration of conductive particles tends to be higher at the bottom of the reaction cell.

Figure 14:
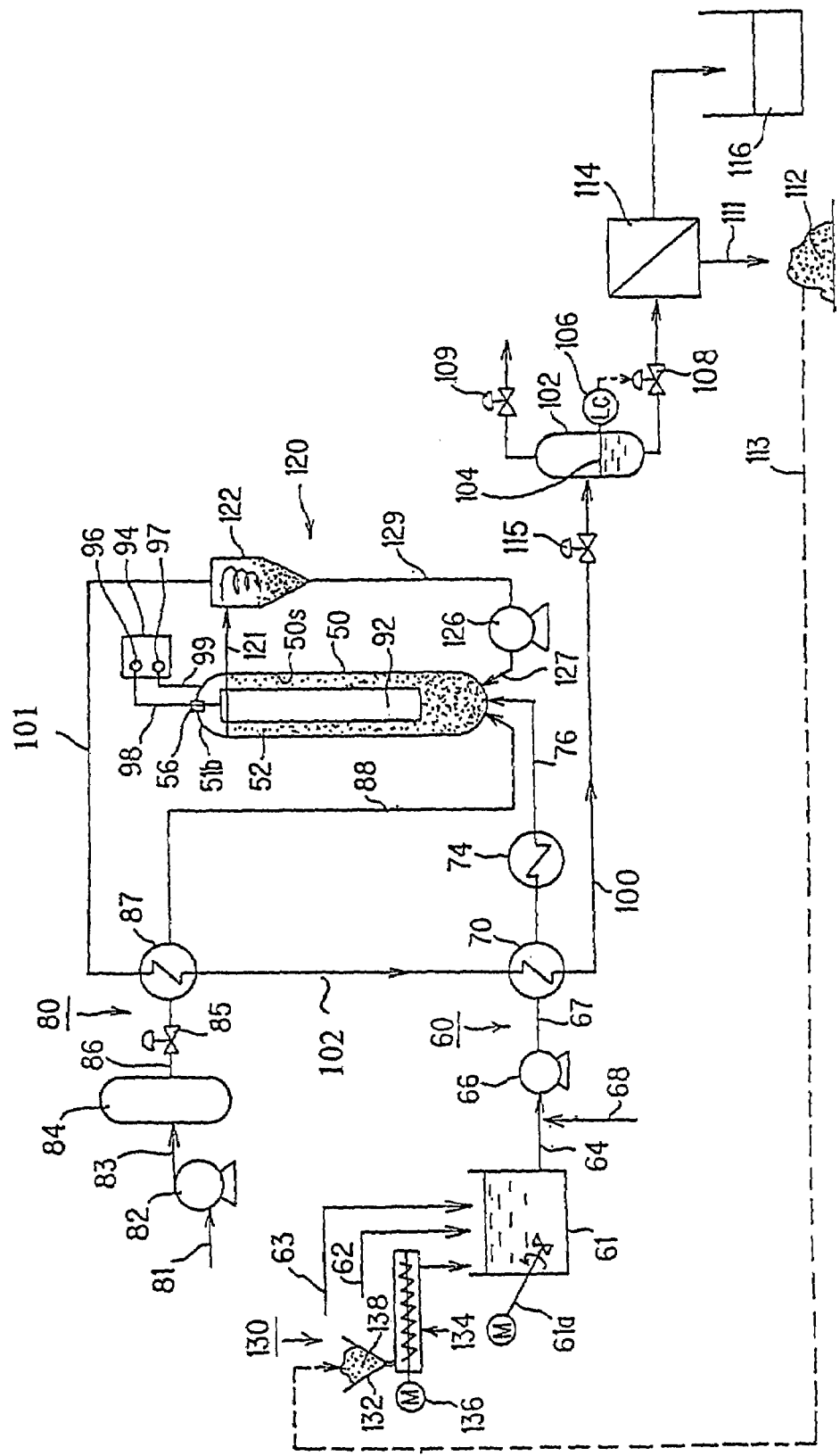
FIG. 14 is a schematic view of a hydrothermal electrolytic treatment system according to a third aspect of the present invention.

The third aspect of the present invention as defined above is explained in detail below with reference to FIG. 14. In FIG. 14, elements having the same operation and function as those of the treatment system shown in FIG. 13 are designated by the same reference numbers and not explained here.

In a hydrothermal electrolytic treatment system according to the third aspect of the present invention shown in FIG. 14, influent line 60 for supplying an influent is connected to reaction vessel 50. Influent line 60 preferably has a feed tank 61, a high-pressure pump 66, a heat exchanger 70 and a heater 74, and an influent can be transferred through these components in this order.

A feeder 130 for supplying conductive particles to feed tank 61 is provided. Feeder 130 comprises a hopper 132 for holding conductive particles 138, and a screw feeder 134 for quantitatively supplying conductive particles 138 to feed tank 61. A motor 136 is connected to screw feeder 134. A screw of screw feeder 134 rotates with rotation of motor 136 to introduce a metered amount of conductive particles 138 into feed tank 61. Hopper 132 may be supplied with crude conductive particles or conductive particles 112 separated by filter device 114. Feed tank 61 is equipped with a stirrer 61a for homogeneously agitating the influent.

Each component in influent line 60 has the same operation as explained with regard to FIG. 13, and is not explained here.

Separately from influent line 60, an oxidizer line 80 is preferably provided. Each component in the oxidizer line also has the same operation as explained with regard FIG. 13, and is not explained here.

Preferably, reaction vessel 50 has an axially extending tubular shape, preferably a cylindrical shape. Reaction vessel 50 includes a pair of electrodes for electrolysis therein. Reaction vessel 50 has a metal inner wall 50s, which can serve as a cathode. For example, the reaction vessel 50 may be wholly made from a metal. Reaction vessel 50 contains a rod-like anode 92 therein. Preferably, an outer face of anode 92 is also cylindrical so that a central axis of anode 92 substantially coincides with a central axis of reaction vessel 50. Anode 92 may be a cylindrically shaped mesh or net, or a cylindrically shaped plate.

Positive terminal 96 and negative terminal 97 of direct current source 94 are connected to anode 92 and cathode, i.e. inner wall 50s, via lines 98, 99, respectively. Line 98 for feeding the anode passes through a top 51b of reaction vessel 50, while line 98 is insulated from reaction vessel 50 by insulating member 56. When reaction vessel 50 is made from a metal, line 99 may be directly connected to reaction vessel 50.

Reaction vessel 50 may be heated by a heater (not shown). The heater may be an electric heater, for example. An exterior of the reaction vessel may be directly heated by a burner or the like.

In the treatment system shown in FIG. 14, a recycle line 120 for recycling conductive particles is connected to the reaction vessel. Recycle line 120 comprises a separator 122 for separating conductive particles from an effluent. Thus, conductive particles can be recycled without being discharged from the system.

Thus, the separator 122 for separating solid particles from the effluent is connected to a top of reaction vessel 50 via line 121. Separator 122 may consist of, for example, a liquid cyclone that centrifugally separates conductive particles. In the liquid cyclone, conductive particles settle at a bottom thereof. In separator 122, all the conductive particles in the effluent may not be separated. Most of the conductive particles may be removed in separator 122, and a remainder of the conductive particles may be removed by filter device 114.

Separator 122 is connected to pump 126 via line 129, and pump 126 is connected to a bottom of reaction vessel 50 via line 127. When separator 122 consists of a liquid cyclone, a concentrated slurry containing conductive particles is obtained. This concentrated slurry can be introduced into the bottom of reaction vessel 50 by pump 126.

An effluent line 100 for discharging effluent deprived of at least a part of conductive particles is connected to separator 122. Effluent line 100 preferably has heat exchangers 87/70, a gas-liquid separator 102, and filter device 114, and effluent hydrothermally electrolyzed in reaction vessel 50 is transferred through these components in this order.

Preferably, gas-liquid separator 102 is connected to effluent line 100. Gas-liquid separator 102 separates gas and liquid in an effluent. The effluent is held at a predetermined level 104 in gas-liquid separator 102. A pressure transmitter tube may be provided between a space above level 104 and the effluent below level 104, and a level detector for determining a gas-liquid interface or slurry level may be provided in this pressure transmitter tube. A level detecting mechanism (not shown) may be designed to measure level 104 by a pressure difference between gas and liquid to discharge effluent in such a manner that level 104 may be fixed or within a fixed range. Gas-liquid separator 102 may be provided with a piezoelectric element, for converting pressure into an electric signal, both above and below level 104, whereby this electric signal is entered into a level detector to detect the pressure difference.

Preferably, gas-liquid separator 102 has a level-controlling mechanism 106 for stabilizing a level of effluent in gas-liquid separator 102 within a fixed range. This level-controlling mechanism may have a level detector for detecting the pressure difference between gas and the effluent, a valve for discharging the effluent, and a controller for controlling the valve by a signal from the level detector. The level-controlling mechanism may have a pressure transmitter tube or a piezoelectric element.

A valve 108 is connected to gas-liquid separator 102 so that treated water in gas-liquid separator 102 can be discharged into filter device 114 when valve 108 is opened. Preferably, switching of valve 108 is controlled by a signal from the level-controlling mechanism.

Gas-liquid separator 102 has the pressure controlling mechanism for controlling pressure in the gas-liquid separator within a predetermined range. The pressure controlling mechanism has, for example, a pressure detector for detecting a pressure of a gas phase, a valve for discharging gas, and a controller for controlling the valve by a signal from the pressure detector. The pressure-controlling mechanism preferably adjusts the pressure at a level that allows filter device 114 to accomplish smooth separation, for example. The pressure detector may have a piezoelectric element.

A valve 109 is connected to gas-liquid separator 102 so that the gas in gas-liquid separator 102 can be discharged to the atmosphere when valve 109 is opened. Preferably, switching of valve 109 is controlled by a signal from a pressure-controlling mechanism (not shown).

In the embodiment shown in FIG. 14, pressure of gas-liquid separator 102 and pressure of reaction vessel 50 are preferably separately controlled so that the pressure of reaction vessel 50 is adjusted to a pressure that allows a liquid phase to be maintained during hydrothermal electrolysis, and the pressure of gas-liquid separator 102 is adjusted to a pressure that allows dielectric particles to be smoothly filtered by filter device 114.

For example, it is especially preferred that a pressure-regulating valve 115 having a pressure sensor is separately provided in line 100 to control pressure of reaction vessel 50. Thus, pressure of reaction vessel 50 is maintained on an inlet side of valve 115, so that pressure of reaction vessel 50 can be controlled via valve 115.

Filter device 114 filters the effluent to separate conductive particles 112 contained in the effluent. Filter device 114 may consist of a filter press, for example. Effluent deprived of conductive particles is stored in a container 116. On the other hand, these conductive particles 112 can be supplied to feeder 130 and recycled.

Next, a hydrothermal electrolytic process using the hydrothermal electrolytic treatment system shown in FIG. 14 is explained.

Feeder 130 supplies a desired amount of conductive particles 138 to feed tank 61 to control a content of conductive particles in an influent. A halide ion source is introduced from halide line 63 or the like into feed tank 61 to control its content. The influent is homogenized under agitation with stirrer 61a.

The influent in feed tank 61 is transferred by high-pressure pump 66, and the influent is preheated in heat exchanger 70 and further heated in heater 74, and then introduced into reaction vessel 50.

On the other hand, compressed air serving as an oxidizer is supplied via oxidizer line 80, preheated in heat exchanger 87, and introduced into reaction vessel 50.

After the influent and oxidizer are introduced into reaction vessel 1, electrolysis is started. Thus, direct current source 94 is turned on to supply direct current to anode 92 and reaction vessel 50 serving as a cathode. Influent maintained in a liquid phase under high temperature and high pressure moves from a bottom to a top in reaction vessel 50, during which hydrothermal reaction and electrolysis proceed at the same time to oxidatively degrade reducible substances in the influent. In a presence of strong acid ions and conductive particles, direct current can readily flow in the influent. A heating temperature of heater 74 is appropriately lowered because heat is generated from hydrothermal reaction and electrolysis.

A reaction time is sufficiently long for reducible substances in the influent to be oxidatively degraded, for example 1 second to 48 hours, preferably 1 minute to 24 hours. The reaction time is more preferably 5 hours or less, still more preferably 2 hours or less. The reaction time is adjusted as a function of volume of reaction vessel 50 and feed flow rate of the influent.

Effluent 52 is introduced into separator 122, where conductive particles in the effluent are separated. Thus, separated conductive particles are introduced with some amount of liquid into reaction vessel 50 by pump 126.

Effluent discharged from separator 122 is circulated through line 101, heat exchanger 87, line 102, heat exchanger 70 and valve 115, and is introduced into gas-liquid separator 102.

Gas is discharged via valve 109, while liquid is introduced into filter device 114 via valve 108. Filter device 114 further removes conductive particles to discharge effluent into container 116.

In the embodiment of the present invention shown in FIG. 14, a hydrothermal electrolytic apparatus according to the first and second embodiments of the present invention described with reference to FIGS. 1–12 may be used as a hydrothermal electrolytic reactor. If a hydrothermal electrolytic apparatus having a plurality of reaction cells as shown in FIGS. 1–12 is used to hydrothermally electrolyze an influent containing conductive particles, efficiency of electrolytic reaction in hydrothermal electrolysis is further improved so that hydrothermal electrolytic treatment can be performed more efficiently. However, conductive particles contained in an influent should have a size smaller than a distance between an anode and a cathode in each reaction cell.

The following examples illustrate a hydrothermal electrolytic apparatus according to the third aspect of the present invention without, however, limiting the present invention thereto.

EXAMPLE 1

Figure 15:
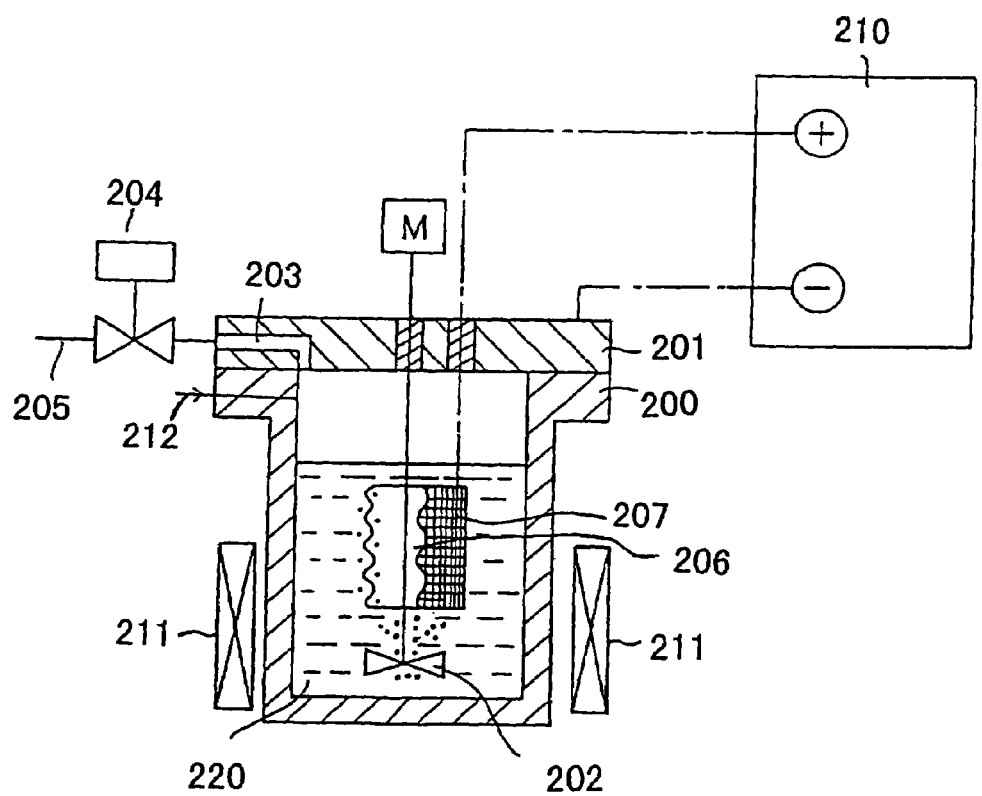
FIG. 15 is a schematic view of an experimental apparatus for a hydrothermal electrolytic process of the present invention used in Example 1.

Experiments were made using an autoclave shown in FIG. 15. The autoclave consists of a container body 200 made from SUS304 and a cover 201, and has an inner volume of 300 ml. An exhaust port 203 is formed in cover 201 and connected to an exhaust pipe 205 having a valve 204. The container body also has a gas inlet 212 for introducing a purge gas.

A cylindrical platinum plate electrode 206 (outer diameter 26.5 mm, height 60 mm, effective area 50 $cm^2$, initial dry weight 35.525 g) was provided in the autoclave. Although electrode 206 is shown as a net member, it was not a net but a plate in this example. Electrode 206 was connected to a positive electrode of outer power source 210, while cover 201 was connected to a negative electrode of the outer power source so that an inner wall face of the container body served as a cathode.

An artificial waste liquor consisting of 4,000 mg/L acetic acid (TOC 1,600 mg/L), 2 wt % NaCl, and tap water was prepared. Spherical particles of silicon dioxide (glass beads) were coated with copper by performing electroless plating to prepare conductive particles. These conductive particles contain 5 wt % copper on a basis of total weight of the conductive particles. These conductive particles had an average particle diameter of 0.2 mm. To 150 mL of the artificial waste liquor was added 5 g of the conductive particles.

At room temperature, 150 ml of the artificial waste liquor containing 5 g of conductive particles was introduced into the autoclave. Then, the autoclave was filled with argon in an amount equivalent to 3 MPa and sealed. Then, contents 220 was heated to 250° C. by a heater 211 under agitation via a stirring impeller 202. When a temperature reached 250° C., application of a 6A constant direct current across electrodes was started and continued at 250° C. for 15 minutes. During this, an average voltage was 7.50 V. After a lapse of 15 minutes, application was stopped and the contents were cooled to room temperature. After the conductive particles in this influent were settled, a supernatant was collected and analyzed.

This supernatant was colorless and odorless, and had a TOC of 30.4 mg/L. Thus, TOC degradation reached 98.1%, showing that a process of the present invention is very effective.

Comparative Example 1

In this comparative example, artificial waste liquor was treated under the same conditions as in the example above except that no conductive particles were added to the artificial waste liquor. When a 6A direct current was applied across electrodes, an average voltage was as low as 3.04 V. After treatment, an effluent showed a TOC of 954 mg/L with TOC degradation of only 40.3%.

Thus, a current flowing in an influent increases and a voltage across electrodes also increases when conductive particles are suspended in the influent.

INDUSTRIAL APPLICABILITY

Hydrothermal electrolytic processes and apparatus according to various aspects of the present invention allow a large amount of waste liquor to be efficiently and continuously treated. Hydrothermal electrolytic apparatus of the present invention are well suitable for continuous processes, but also applicable to batch processes or semi-continuous processes.

What is claimed is:

1. A method for clarifying influent, comprising:
   introducing an influent containing water and a reducing substance into a reaction cell that includes
      (i) at least two tubular reaction cells each having a metal inner wall that serves as a cathode, and
      (ii) an anode in each of said at least two tubular reaction cells; and
   supplying a direct current into said reaction cell while a temperature within said reaction cell is within a range of from 100° C. to a critical temperature of said influent and a pressure within said reaction cell is such that the water of said influent is maintained in a liquid phase.
2. The method according to claim 1, further comprising: introducing an oxidizer into said reaction cell; and discharging an effluent from said reaction cell.
3. The method according to claim 1, further comprising: introducing conductive particles into said reaction cell.
4. The method according to claim 3, further comprising:
   discharging an effluent and at least some of said conductive particles from said reaction cell; and
   separating said at least some of said conductive particles from said effluent.
5. The method according to claim 4, wherein separating said at least some of said conductive particles from said effluent comprises using one of a liquid cyclone and a filter device to separate said at least some of said conductive particles from said effluent.
6. A method for clarifying influent, comprising:
   introducing an influent containing water and a reducing substance into a reaction cell that includes
      (i) a first electrode having concentrically arranged cylindrical first side walls and a first connecting member for interconnecting said concentrically arranged cylindrical first side walls, and
      (ii) a second electrode having concentrically arranged cylindrical second side walls and a second connecting member for interconnecting said concentrically arranged cylindrical second side walls,
   with said concentrically arranged cylindrical first side walls and said concentrically arranged cylindrical second side walls being alternately arranged so as to form a channel therebetween for said influent; and
   supplying a direct current into said reaction cell while a temperature within said reaction cell is within a range of from 100° C. to a critical temperature of said influent and a pressure within said reaction cell is such that the water of said influent is maintained in a liquid phase.
7. The method according to claim 6, further comprising: introducing an oxidizer into said reaction cell; and discharging an effluent from said reaction cell.
8. The method according to claim 6, further comprising: introducing conductive particles into said reaction cell.
9. The method according to claim 8, further comprising:
   discharging an effluent and at least some of said conductive particles from said reaction cell; and
   separating said at least some of said conductive particles from said effluent.
10. The method according to claim 9, wherein separating said at least some of said conductive particles from said effluent comprises using one of a liquid cyclone and a filter device to separate said at least some of said conductive particles from said effluent.

* * * * *